United States Patent
Kumar et al.

(10) Patent No.: US 10,201,810 B2
(45) Date of Patent: Feb. 12, 2019

(54) VACUUM RESID UPGRADATION AND GRAPHITE PRODUCTION

(71) Applicant: INDIAN OIL CORPORATION LIMITED, Mumbai (IN)

(72) Inventors: Brijesh Kumar, Faridabad (IN); Pravesh Kumar, Faridabad (IN); Kamal Kumar, Faridabad (IN); Ganesh Vitthalrao Butley, Faridabad (IN); Madhusudan Sau, Faridabad (IN); Biswapriya Das, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 92 days.

(21) Appl. No.: 15/232,695

(22) Filed: Aug. 9, 2016

(65) Prior Publication Data

US 2017/0128929 A1    May 11, 2017

(30) Foreign Application Priority Data

Nov. 9, 2015    (IN) .......................... 4268/MUM/2015

(51) Int. Cl.
| | |
|---|---|
| *C10G 65/00* | (2006.01) |
| *B01J 37/08* | (2006.01) |
| *C10G 65/12* | (2006.01) |
| *B01J 23/745* | (2006.01) |
| *B01J 23/28* | (2006.01) |
| *B01J 37/18* | (2006.01) |
| *B01J 37/20* | (2006.01) |

(Continued)

(52) U.S. Cl.
CPC ............. *B01J 37/086* (2013.01); *B01J 23/28* (2013.01); *B01J 23/745* (2013.01); *B01J 23/883* (2013.01); *B01J 35/0013* (2013.01); *B01J 37/18* (2013.01); *B01J 37/20* (2013.01); *C01B 32/20* (2017.08); *C10G 47/02* (2013.01); *C10G 47/26* (2013.01); *C10G 65/12* (2013.01); *C10G 2300/202* (2013.01); *C10G 2300/205* (2013.01); *C10G 2300/703* (2013.01)

(58) Field of Classification Search
CPC .. C10G 47/26; C10G 65/12; C10G 2300/703; C10G 2300/202; C10G 2300/205; B01J 37/086; B01J 23/745; B01J 23/28; C10B 55/00; C10B 57/06; C10B 57/045
See application file for complete search history.

(56) References Cited

U.S. PATENT DOCUMENTS

| | | |
|---|---|---|
| 3,453,206 A | 7/1969 | Gatsis |
| 3,501,396 A | 3/1970 | Gatsis |

(Continued)

*Primary Examiner* — Randy Boyer
*Assistant Examiner* — Brandi M Doyle
(74) *Attorney, Agent, or Firm* — Maschoff Brennan

(57) ABSTRACT

The present invention discloses a catalyst and process for hydrocracking of heavy hydrocarbon oils having majority portion boiling above 525° C. in the presence of hydrogen. A process comprising first step of converting heavy oil into lighter products in the presence of catalyst and hydrogen in slurry phase is disclosed. The process further comprises recycling of part of liquid products (HVGO) along with fresh heavy oil for improving the product selectivity. This recycled HVGO is having high concentrations of aromatics compounds. The separation of particles generated during the reaction at reactor exit also avoids the chances of choking of downstream sections.

19 Claims, 3 Drawing Sheets

Process Flow diagram

(51) Int. Cl.
  *B01J 35/00* (2006.01)
  *C10G 47/02* (2006.01)
  *C10G 47/26* (2006.01)
  *C01B 32/20* (2017.01)
  *B01J 23/883* (2006.01)

(56) References Cited

U.S. PATENT DOCUMENTS

| | | |
|---|---|---|
| 3,586,621 A | 6/1971 | Pitchford et al. |
| 3,676,331 A | 7/1972 | Pitchford |
| 3,733,259 A | 5/1973 | Wilson et al. |
| 4,067,799 A | 1/1978 | Bearden, Jr. et al. |
| 4,134,825 A * | 1/1979 | Bearden, Jr. ............ C10G 45/16 208/108 |
| 4,214,977 A | 7/1980 | Ranganathan et al. |
| 4,298,460 A | 11/1981 | Fujimori et al. |
| 4,325,812 A | 4/1982 | Fujimori et al. |
| 4,325,821 A | 4/1982 | Escalera |
| 8,128,810 B2 | 3/2012 | Bhattacharyya et al. |
| 2009/0008290 A1 * | 1/2009 | Biswas ................ C10G 67/049 208/57 |
| 2009/0326304 A1 * | 12/2009 | Bhattacharyya ....... B01J 23/745 585/653 |
| 2011/0142729 A1 * | 6/2011 | McGehee ............ C10G 21/003 422/211 |

* cited by examiner

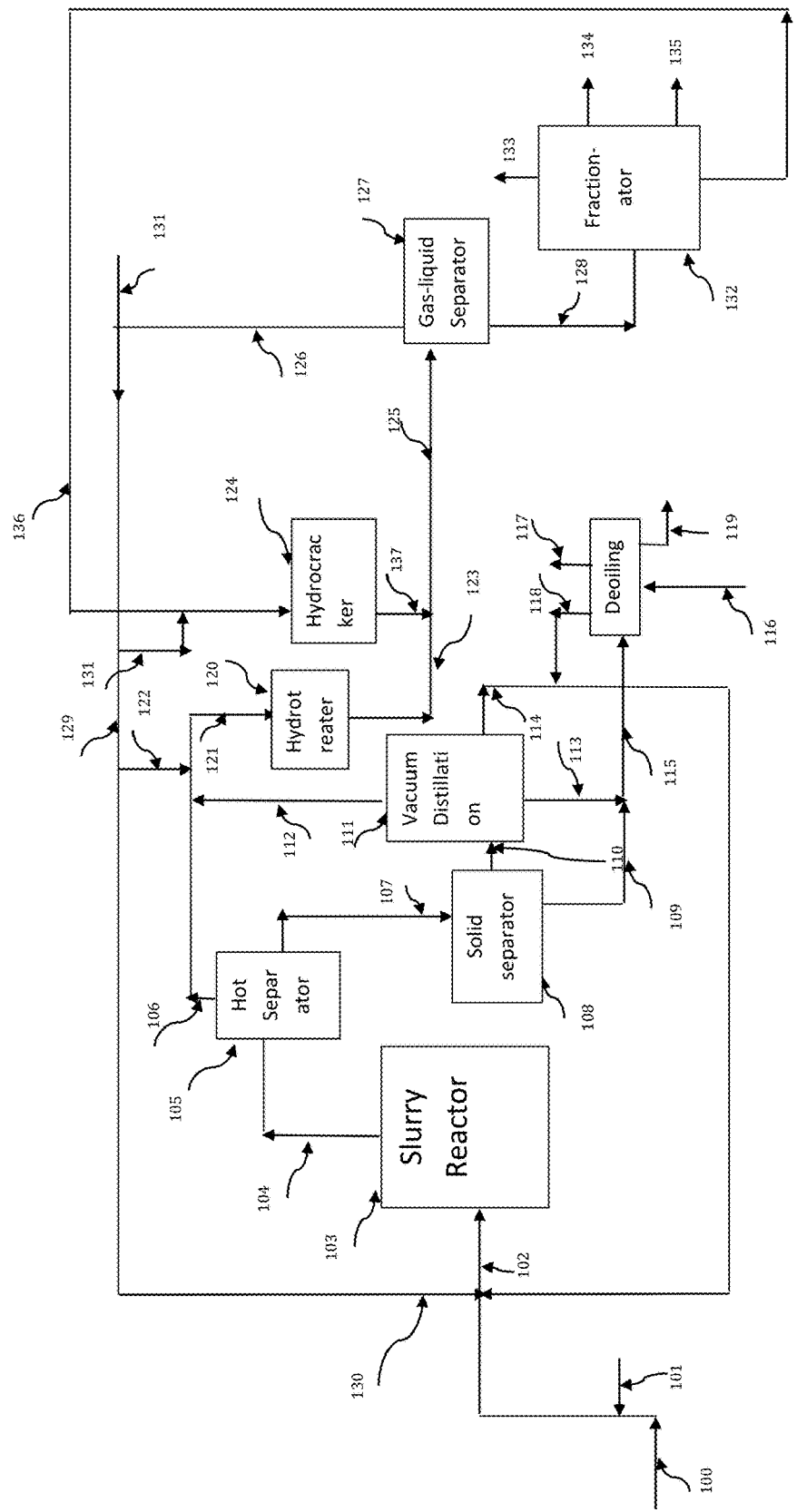
Figure-1 Process Flow diagram

FIG.2 SEM images showing crystallinty of coke with Ferrocene
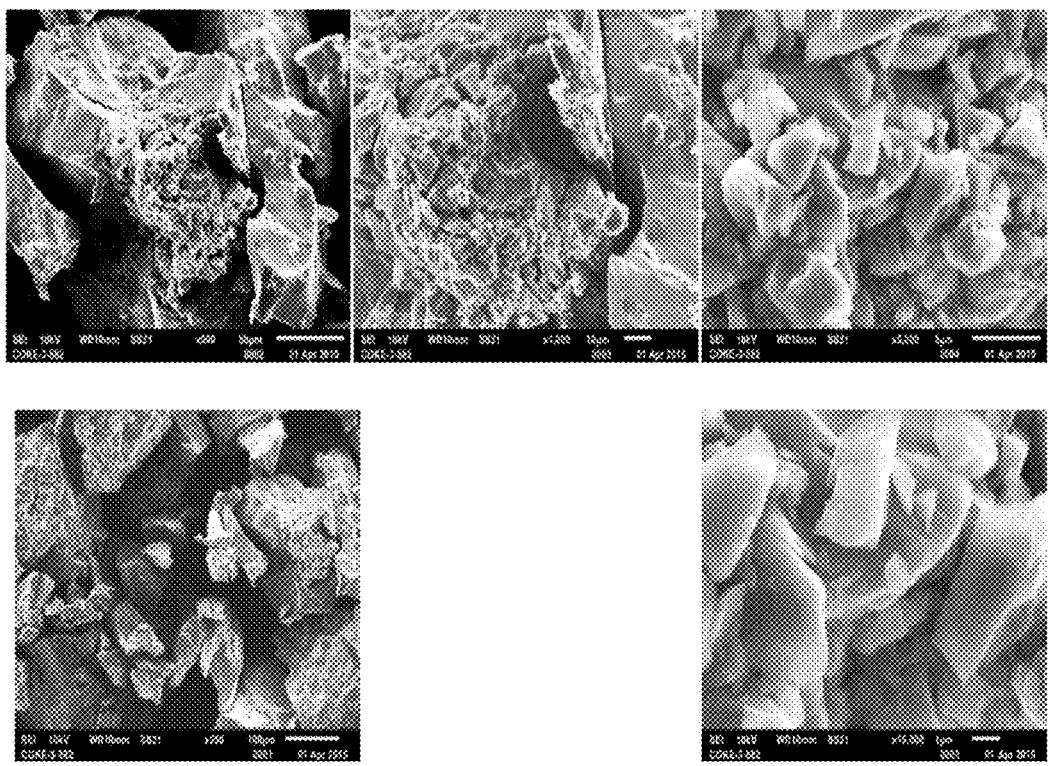

FIG.3. XRD pattern showing crystallinity of coke
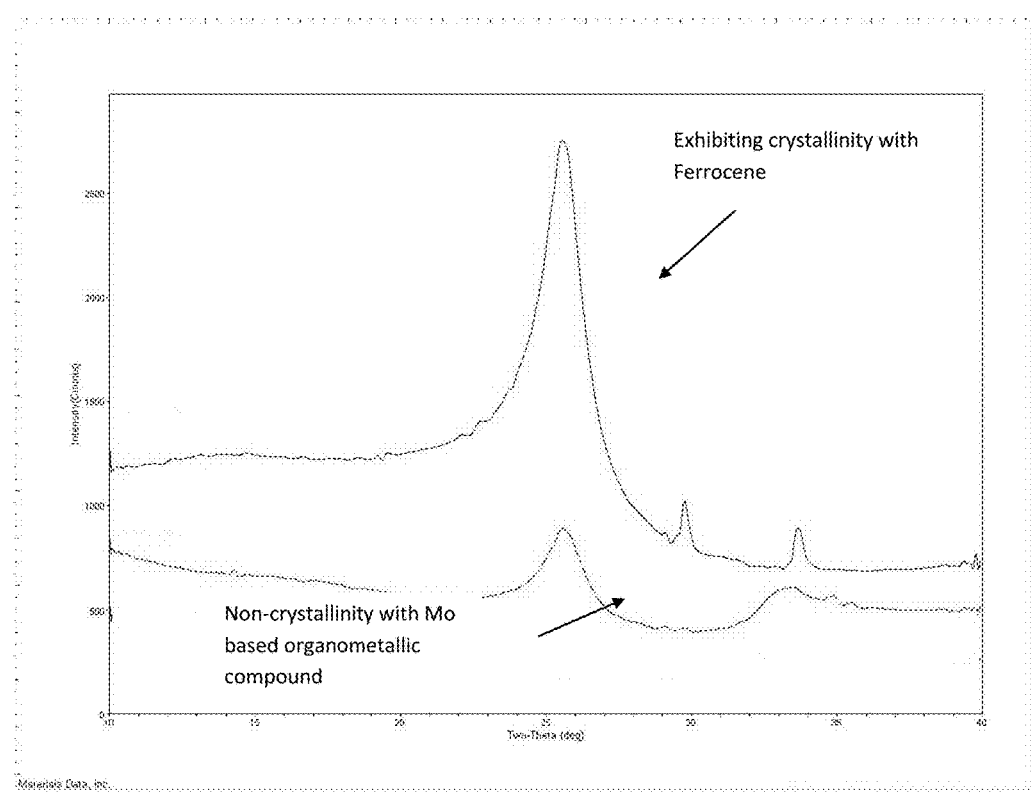

VACUUM RESID UPGRADATION AND GRAPHITE PRODUCTION

BACKGROUND OF THE INVENTION

There exist enormous quantities of heavy hydrocarbons such as heavy petroleum crude oils and tar sand bitumen (the heavy hydrocarbons extracted from tar sands), as well as residual heavy hydrocarbon fractions obtained from heavy hydrocarbon crudes such as atmospheric tower bottoms products, vacuum tower bottoms products, crude oil residuum and heavy vacuum gas oils. These heavy crudes and residual hydrocarbon streams contain large amounts of organometallic compounds, especially those containing nickel and vanadium, organosulfur and organonitrogen compounds, and asphaltenes (high molecular weight polycyclic, heptane insoluble materials). In addition, these heavy crude and residual hydrocarbons are viscous and as such require a greater degree of processing to convert them into liquid materials that can be transported easily.

A number of alternate physical and chemical routes have been developed and are still being developed for converting heavy hydrocarbon materials into lighter liquid and gaseous fuels. Among the approaches available are physical separation processes such as vacuum distillation, steam distillation, and solvent deasphalting, various thermal conversion processes such as visbreaking, delayed coking, fluid coking and coke gasification, catalytic processes such as hydrotreating, hydrorefining and hydrocracking, as well as multistage catalytic and non-catalytic processes. Each of these approaches has one or more drawbacks. In physical separation processes such as vacuum distillation, steam distillation and solvent deasphalting, a liquid hydrocarbon fraction is recovered in low yield but the asphaltene and resinous materials are not converted into product and must be disposed of separately. The various thermal conversion processes such as visbreaking, delayed coking, fluid coking and coke gasification require high temperatures above 500° C. and generate a low quality by-product coke. In coke gasification, treatment of heavy hydrocarbons with steam and oxygen at high temperatures is necessary to produce a product gas, which must be utilized locally, and has a limited yield of lighter liquid hydrocarbon product.

There are various processes for treating heavy hydrocarbons with and without water with specific externally supplied catalyst systems, or in some cases a second reactant, and externally supplied hydrogen or hydrogen donors at specified temperatures above the critical temperature of water and at specified pressures, from below to above the critical pressure of water.

U.S. Pat. No. 4,067,799 (Breaden, Jr. et al.) discloses a catalytic process for production of low boiling hydrocarbon products by treating heavy hydrocarbonaceous oil with hydrogen gas in the presence of a catalyst comprising a metal (such as cobalt, nickel) phthalocyanine and a particulate iron component. However, the process of U.S. Pat. No. 4,067,799 uses no water and the metal content of the lower boiling hydrocarbon product is not reported.

U.S. Pat. No. 4,214,977 (Ranganathan et al.) discloses a process for hydrocracking of heavy oils such as oils extracted from tar sands by use of an aqueous iron-coal catalyst in the presence of excess hydrogen gas. However, while the process produces light oils from tar sand bitumen, the process operates in the absence of water (except residual water present from the preparation of the specific catalyst) requires coal in combination with an iron catalyst to reduce coke deposition and there is no mention of the metal content of the lower hydrocarbon product.

U.S. Pat. Nos. 4,298,460 and 4,325,812 (both by Fujimori et al.) disclose two and three zone processes for cracking sulfur-containing heavy oils into light oils and producing significant quantities of hydrogen and coke. U.S. Pat. No. 4,298,460 discloses a three zone process for reaction of sulfur-containing heavy oil with a reduced iron species to produce coke, hydrogen, hydrogen sulfide, desulfurized light oil of unspecified heavy metal content and the recycling of the iron-containing species in a two-step process. The reaction disclosed in U.S. Pat. No. 4,298,460 is not catalytic but requires at least 2.5 times (on a weight basis) as much iron-containing species as sulfur-containing oil; said reaction does not require the presence of water in the first zone but requires two separate zones to process the iron-containing species removed from the first zone and to produce significant quantities of hydrogen sulfide, hydrogen and coke. U.S. Pat. No. 4,325,812 discloses a two-zone process for cracking sulfur-containing heavy hydrocarbons into light oils and producing significant quantities of hydrogen. Like U.S. Pat. Nos. 4,298,460, 4,325,812 produces significant amounts of hydrogen and coke and is not really catalytic; at least equivalent amounts of sulfur-containing heavy oil and iron-containing species are contacted in the first zone. As in the case of U.S. Pat. No. 4,298,460, the metal content of the product produced in U.S. Pat. No. 4,325,821 is not specified.

U.S. Pat. No. 3,453,206 (Gatsis et al.) discloses a multistage hydrorefining of petroleum crude oil wherein the heavy hydrocarbon feedstock is treated in a first reaction zone with a mixture of hydrogen and water at a temperature above the critical temperature of water and at a pressure of at least 1000 pounds per square inch gauge (psig) and in the absence of a catalyst; the product from a first zone is a liquid which is further treated with hydrogen in a second reaction zone in the presence of a catalyst at hydrorefining conditions. However, this process requires a separate processing step to supply relatively large quantities of hydrogen from expensive starting materials such as naptha or other hydrocarbon feeds.

U.S. Pat. No. 3,501,396 (Gatsis et al.) discloses a process for desulfurizing and denitrifying oil which comprises mixing the oil with water at a temperature above the critical temperature of water up to about 427° C. (800° F.) and at a pressure in the range of from about 1000 to about 25000 psig and reacting the resulting mixture with externally supplied hydrogen in contact with a catalytic composite. The catalytic composite is characterized as a dual function catalyst which is acidic in nature and comprises a metallic component such as iridium, osmium, rhodium, ruthenium and mixtures thereof and an acidic carrier component having cracking activity.

U.S. Pat. No. 3,586,621 (Pitchford et al.) discloses a method for converting heavy hydrocarbon oils, residual hydrocarbon fractions, and solid carbonaceous materials to more useful gaseous and liquid products by contacting the material to be converted with a nickel spinel (nickel aluminate) catalyst promoted with a barium salt of an organic acid in the presence of steam.

U.S. Pat. No. 3,676,331 (Pitchford et al.) discloses a method for upgrading hydrocarbons and thereby producing materials of low molecular weight and of reduced sulfur content (but unspecified metal content) and carbon residue by introducing water and a catalyst system containing at least two components into the crude hydrocarbon fraction. Suitable materials for use as the first component of the catalyst system are the C8-C40 carboxylic acid salts of barium, calcium, strontium, and magnesium. Suitable materials for use as the second component of the catalyst system are the C8-C40 carboxylic acid salts of nickel, cobalt and iron.

U.S. Pat. No. 3,733,259 (Wilson et al.) discloses a process for removing metals, asphaltenes, and sulfur from a heavy hydrocarbon oil. The process comprises dispersing the oil in water, maintaining this dispersion at a temperature between 399° C. and 454° C. (750° F. and 850° F.) and at a pressure between atmospheric and 100 psig, cooling the dispersion after at least one-half hour to form a stable water-asphaltene emulsion, separating the emulsion from the treated oil, adding hydrogen, and contacting the resulting treated oil with a hydrogenation catalyst in the presence of externally added hydrogen at a temperature between 260° C. and 482° C. (500° F. and 900° F.) and at a pressure between about 300 and 3000 psig.

U.S. Pat. No. 4,134,825 (Bearden et.al.) disclose a process for catalytic hydroconversion of heavy hydrocarbons oil charge stock having a Conradson carbon content of at least 5 weight percent. The process comprises charging the oil soluble metal compound in an amount ranging from 10 to about 950 weight ppm, calculated as the elemental metal, based on said oil chargestock, and converting the oil-soluble metal compound (preferably molybdenum compounds) to a solid non-colloidal catalyst within said oil in the presence of a hydrogen-containing gas by heating said oil to elevated temperature ranging from about 325-415° C. at a pressure ranging 500-5000 psig. The hydro conversion takes place at a temperature ranging from 440 to 468° C. at a pressure ranging from about 1000 to about 3000 psig. The effluent from the hydroconversion reactor is separated in a gas liquid separator where hydrogen and light hydrocarbons are removed overhead and the liquid stream containing the dispersed catalyst solid is either distilled, solvent precipitated or centrifuged to separate into a clean liquid product and concentrated slurry.

U.S. Pat. No. 8,128,810 (Bhattacharya et.al.) discloses a process for using catalyst with nanometer crystallites in slurry hydrocracking. The process comprises hydrocracking of hydrocarbon feed in presence of a catalyst comprising iron oxide and alumina at a temperature range of 400-500° C. under pressure in the range of 500 to 3500 psi, to produce lighter hydrocarbons. The iron sulphide crystallites have diameter in the nanometer range. The effluent is separated in a high-pressure separator into a gas and liquid component. The gaseous stream consists of about 35 to 80 vol % of the hydrocarbon product and is processed to recover hydrocarbons and hydrogen for recycle. The liquid stream is further separated into light vacuum gas oil stream, heavy vacuum gas oil stream and a pitch stream. At least a portion of the pitch stream is recycled back to the slurry reactor.

There is still a vast scope of working in the technology for upgrading the heavy hydrocarbon oils by hydrocracking. The coke formation during hydrocracking is a big limitation and there is a need to work out a process either to eliminate this or producing a high value coke to increase its commercial value.

SUMMARY OF THE INVENTION

In the present invention, a catalyst and process is disclosed for hydrocracking of heavy oils in the presence of catalyst. The catalyst used in the present invention, is oil soluble organometallic iron based compound decomposable under elevated temperature conditions generating nano sized metallic iron particles which penetrate asphaltene micelles due to their nano sizes and providing better dispersion and higher activity as compared to conventional Fe based catalysts like bauxite or redmud. The catalyst being oil soluble avoids the requirement for solid handling and expensive and proprietary methods for manufacturing. During reaction, the catalyst gets converted into finely dispersed nano sized metallic iron particles, as compared to the conventional slurry resid hydrocracking catalyst. The nano sized metallic iron particles dispersed finely throughout the hydrocarbon oil is obtained by the preheating of hydrocarbon oil, hydrogen and oil soluble catalyst at predetermined fast enough velocities so that the agglomeration of iron atoms after decomposition of oil soluble catalyst is minimized. Due to decomposition, the nano sized metallic iron particles are formed. Therefore, these nano sized particles can easily penetrate into asphaltene micelles and participate in the reaction. During reaction, the heavy oil gets hydrocracked to lighter products.

In the present invention, the catalyst and process thereof to convert heavy oil into lighter liquid products in Slurry bed hydrocracking reactor is disclosed. The pitch is contacted with suitable solvent to recover the oil and thus extracted oil is sent back to slurry reactor. The deoiled pitch is graphitic in nature and having many applications including but not limited to lubricant, production of graphene and electrodes. The process further comprises recycling of part of liquid products Heavy Vacuum Gas Oil (HVGO) and oil extract from pitch along with fresh heavy oil for improving conversion and product selectivity.

DESCRIPTION OF THE DRAWINGS

FIG. 1 illustrates the schematic diagram of the process flow

FIG. 2. illustrates the SEM analysis of deoiled pitch

FIG. 3. illustrates the XRD pattern of deoiled pitch

DETAILED DESCRIPTION OF DRAWING

The scheme for Slurry-bed Resid hydrocracking is shown in FIG. 1. The heavy oil feed line 100 and the HVGO recycle feed stream having highly aromatic nature 114 along with decanted oil 118 mixed with the catalyst 101 and hydrogen stream 130 is combined in line 102. The combined feed 102 is heated and the heated stream is pumped into an inlet in the bottom of tubular slurry hydrocracking reactor 103 and is distributed through an appropriate distributor. Typically, the recycled HVGO feed stream 114 makes up in the range of 1-5% wt % of the feedstock to Slurry Hydrocracking Reactor (SHC) reactor while the decanted oil stream 118 is in the range of 4-12%. The pitch stream 115 consisting of solid particles 109 and Unconverted Oil 113 consisting of particle of any size is combined and deoiled using a suitable solvent 116 i.e. toluene. The hydrocarbon oil 118 is decanted and recycled and the graphite 119, which is toluene insoluble is recovered.

The feed entering the SHC reactor comprises liquid hydrocarbon feed, sulphided catalyst and hydrogen. The process can be operated at moderate pressure, in the range of 40 to 220 bar and preferably in the range of 100 to 190 bar in SHC reactor 103. The reactor temperature is typically in the range of 400 to 510° C. with a temperature of about 430 to 480° C. being suitable and a range of 440 to 475° C. being preferred. The Liquid Hourly Space Velocity (LHSV) is typically below about 4 h$^{-1}$ on a fresh feed basis with a range of about 0.1 to 2.5 h$^{-1}$ being preferred and a range of about 0.3 to 1 h$^{-1}$ being particularly preferred. Although SHC can be carried out in a variety of known reactors of either up or downflow, it is particularly well suited to a tubular reactor through which feed, catalyst and gas move upwardly. Hence, the outlet 104 from SHC reactor 103 is above the inlet. Although only one reactor is shown in FIG. 1, one or more SHC reactors 103 may be utilized in parallel or in series.

A gas-liquid mixture is withdrawn from the top of SHC reactor 103 through line 104 and separated preferably in a hot high pressure separator 105 kept at a separation temperature of between 250 to 470° C. and preferably at about the pressure of SHC reactor. In the hot separator 105, the effluent from the SHC reactor 104 is separated into a gaseous stream 106 and a liquid stream 107. The liquid stream 107 contains Heavy VGO and Unconverted oil and coke. The gaseous stream 106 comprises between about 35 and 90 wt % of hydrocarbon products from the SHC reactor 103 and is further processed to recover hydrocarbons and hydrogen for recycle.

The liquid portion 107 of the product consisting dissolved solids, from hot separator 105 is separated into liquid and solid fraction in solid separator 108 by removing solid particles 109 of all sizes and purged out of the system while liquid portion is separated in liquid vacuum fractionation column 111. Line 110 introduces the liquid fraction from the solid separator 108 preferably to a vacuum distillation column 111 maintained at a pressure between about 1.7 and 10.0 kPa and at a vacuum distillation temperature resulting in an atmospheric equivalent cut point between VGO and Heavy VGO of between about 250° C. and 500° C. Three fractions may be separated in the liquid fractionation column: an overhead fraction of VGO in an overhead line 112 which may be further processed, a Heavy VGO stream from a side cut in line 114 and an Unconverted oil stream obtained in a bottoms line 113 which typically boils above 525° C. Adding lower polarity aromatic oil to the feedstock reduces coke production. The polar aromatic material may come from a variety of sources. The heavy VGO 114 which is typically 1-5% wt % of the fresh feed may be recycled to provide required polarity.

The gaseous stream in line 106 typically contains lower concentrations of aromatic components than the liquid fraction in line 107 and requires further refining. The gaseous stream in line 121 may be passed to a catalytic hydrotreating reactor 120 having a bed of hydrotreating catalyst. If necessary, additional hydrogen may be added in line 121 via line 122. Suitable hydrotreating catalysts for use in the present invention are any known conventional hydrotreating catalysts and include those which are comprised of at least one Group VIII metal and at least one Group VI metal on a high surface area support material, such as refractory oxide. The gaseous stream is contacted with the hydrotreating catalyst at a temperature between about 200° C. and 600° C. in the presence of hydrogen at a pressure between about 20 bar to 90 bar. The hydrotreated product from the hydrotreating reactor 120 may be withdrawn through line 123.

The effluent from hydrotreating reactor 120 in line 123 is mixed with catalytic cracking reactor 124 effluent 137. The combined effluent 125 may be delivered to a separator (HPS) 127. Within the HPS, the product is separated into a gaseous stream rich in hydrogen which is drawn off through the overhead line 126 and a liquid hydrocarbon product which is drawn off the bottom through 128. The gaseous part 126 constituting majority of hydrogen gas (>90%) is recycled back to reactor 103 through line 130. Additional make-up hydrogen may be added in line 126 via line 131. The liquid part 128 of HPS further goes to a product fractionator 132.

The product fractionator 132 may comprise one or several vessels although it is shown only as one in FIG. 1. The product fractionators produces a C$_4$- recovered in overhead line 133, a naphtha product stream in line 134, a diesel stream in line 135 and a VGO stream in bottoms line 136, which gets recycled to fixed bed hydrocracking reactor 124 having a bed of hydrocracking catalyst. The hydrogen is added in line 136 via line 131. Any suitable conventional hydrocracking catalysts known in the art can be used in present and include those which are comprised of at least one Group VIA and one Group VIIIA metal at high surface area support material. The VGO stream from fractionator bottom 136 is contacted with the hydrocracking catalyst at a temperature between 250 to 650° C. in the presence of hydrogen at a pressure between 30 to 210 bar.

Detailed Description of the Invention

While the invention is susceptible to various modifications and/or alternative processes and/or compositions, specific embodiment thereof has been shown by way of example in tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The figures and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

A catalyst and process for converting heavy hydrocarbon oils having majority portion boiling above 525° C. to premium quality lighter hydrocarbon products is disclosed. The process constitutes four steps: hydrocracking in slurry phase, separation, hydroprocessing and product fractionation.

According to the embodiment of the invention, the catalyst and process for the hydrocracking (cracking in presence of hydrogen & catalyst) conversion of heavy hydrocarbon oils having majority portion boiling above 525° C., a substantial portion of which boil above 525° C. into lighters and can be used as transportation fuels after hydrotreating and producing graphite, which comprises:

a. passing a mixture of hydrogen, heavy hydrocarbon oil, and oil soluble catalyst, from about 0.01-2% by weight (based on fresh feedstock), is dissolved in hydrocarbon oil is preheated to predetermined temperature in the range of 300 to 600° C. while hydrocarbon oil is at predetermined fast enough velocity and passed through a confined hydrocracking zone in upflow mode being maintained at temperature between 250° C. and 550° C., pressure between 40 to 250 bar and a space velocity of 0.5 h$^{-1}$ up to 4 h$^{-1}$;

b. the oil soluble catalyst undergoes decomposition and forms finely dispersed nano sized metallic iron particles in hydrocarbon oil before entering the reactor;

c. the reaction products comprising hydrogen sulfide, hydrocarbon vapors and liquid consisting heavy hydrocarbon oil and catalyst are removed from the top of hydrocracking zone;

d. separating the reaction mixture and recycling the hydrocarbons boiling between 500° C. to 525° C. termed as HVGO and having aromatics compounds in concentrations more than 70 wt %, more preferably more than 80 wt % to slurry reactor (step 1 (a)). The recycling increases aromatics concentration, hence, reduces mesosphase formation which leads to asphaltene precipitation and subsequent coking along with increase in formation of lower boiling components;

e. recovering the hydrocarbons boiling below 500° C. as products and hydrocarbons boiling above 525° C. as pitch;

f. the oil content of the pitch is removed using solvent and graphite is obtained.

In the first step, the fresh heavy hydrocarbon oil feed, recycled HVGO from separator section, oil extract from pitch and catalyst which is dissolved in oil, is charged to slurry reactor along with hydrogen where under elevated temperature conditions the catalyst gets converted into finely dispersed nano sized metallic iron particles which can penetrate into asphaltene micelles thus providing higher activity. Under the elevated temperature conditions, first the organometallic compound gets decomposed. The decomposition starts from around 400° C. and gets completed before the feed and the catalyst reaches the slurry reactor. The preheating of hydrocarbon oil, hydrogen and oil soluble catalyst is carried out at predetermined fast enough velocity so that agglomeration of iron atoms after decomposition of oil soluble catalyst is minimized. Due to decomposition, the nano sized metallic iron particles are formed. Each of these nano sized iron particles are only composed of only few iron atoms (about 10 to 100 each) due to high superficial velocity and rapid rate of decomposition. Therefore, these nano sized particles can easily penetrate into asphaltene micelles and participate in the reaction. During reaction, the heavy oil gets hydrocracked to lighter products.

Since the catalyst particles are finely dispersed throughout the oil in nano sized particles form, the catalyst is effective even at lower concentration of 100 ppm or lower allowing higher conversion of heavy hydrocarbons feed (525° C.+) with sufficiently low production of coke. The slurry reaction operating conditions are controlled to avoid generation of mesophase which indicates the formation of coke.

Further, due to decomposition of catalyst at fast velocities in heavy hydrocarbon oil, the nano sized iron particles thus formed are capable of converting the coke (formed during hydrocracking) into graphitic grade carbon. This is the most innovative feature of the invention and the results are quiet surprising. Since the graphitic grade carbon which is obtained after solvent deoiling of pitch (as explained below) is having specific crystallinity and can thus be marketed as high grade graphite. The unique feature of the invention is that graphitic grade coke is not formed, if other slurry hydrocracking catalysts such as Mo, Ni, Co or Fe in oil soluble or water soluble form. Different type of metallic catalyst like Mo, Ni, Co, and Fe in oil soluble form can be used for this process. However, the quality of coke obtained using these catalyst is not having crystallinity as compared to proposed catalyst i.e. Ferrocene which produces nanoparticles of iron during decomposition and produces the coke which shows significant crystallinity and can be used as graphite.

The second step is separation section, in which, the effluent from reactor is separated in two portions: first portion comprising hydrocarbons boiling up to 500° C. and essentially free of solid catalyst particles and second portion boiling above 500° C. containing solid catalyst and coke particles of all sizes. The second portion is further separated in two parts in another separator: first boiling between 500° C. to 525° C. termed as Heavy Vacuum Gas Oil (HVGO) and the second portion boiling above 525° C. termed as pitch. The HVGO having very high concentrations of aromatic compounds is recycled to slurry reactor along with fresh heavy oil feed. The second portion from second separator i.e. pitch containing solid catalyst particles is deoiled to recover the liquid fractions and graphite. The LPG produced acts as solvent, while the extracted oil portion is again sent back to the slurry reactor. The deoiled pitch is graphitic in nature and can be used in lubricant, production of graphene and carbon nanotubes. As described above this is the unique feature of the invention. Experimental examples shown clearly indicates that with other types of catalyst when used in slurry hydrocracking, then coke formed is amorphous and do not have any crystallinity and thus cannot be used as high grade graphite.

The oil can be removed from the pitch using any suitable solvent selected from propane, butane, pentane, hexane, heptanes, benzene, toluene or mixtures thereof. However, the LPG and toluene is most preferred solvents. The volumetric ratio of solvent to pitch can be from 0.5 to 10 vol/vol and the temperature of extraction can be ranging from 100° C. to 250° C. The solvent wash can be in the single stage or multiple stages.

In the third step, the reactor effluent up to VGO fractions boiling below 500° C. from first separator are hydrotreated under conventional hydroprocessing conditions using conventional hydrotreating catalysts.

In the fourth and final step, the effluent from hydrotreating reactor is fractionated and premium quality lighter liquid products boiling up to 370° C. are recovered while fractionator bottom i.e. hydrotreated Vaccum Gas Oil is recycled back to hydrocracking reactor of conventional hydroprocessing step or can be sent to FCC or lube producing unit.

Some of the preferred embodiments of this invention are explained in non-limiting examples below:

EXAMPLE 1

A feed suitable for SHC is characterized in Table-1. This feed was used in all the examples:

TABLE 1

| Characteristics of Feed stock | |
|---|---|
| Properties | Feed(VR) |
| Specific gravity, g/cc | 1.020 |
| ICAP Metals (ppm) | |
| Mo | 2.8 |
| Ni | 49 |
| V | 174 |
| Fe | 8.5 |

TABLE 1-continued

Characteristics of Feed stock

| Properties | Feed(VR) |
|---|---|
| CCR | 24.79 |
| S, wt % | 5.4 |
| Total N, ppm | 1400 |
| Heptane insolubles, wt % | 8.55 |

EXAMPLE 2

An oil soluble Mo based organometallic compound which acts as a hydrogenation catalyst was used. The catalyst was pretreated by adding 2 wt % sulfiding agent relative to the feed and catalyst and heating the mixture to 220° C. at 30 bar and charging the heated mixture at high temperature and high velocity through a 10 meter long tube in a 1 litre autoclave reactor using hydrogen gas within 15 minutes to activate the catalyst before heating the mixture to reaction temperature in the autoclave. In a typical experiment, 300 grams of vacuum resid of Example 1 was charged in a 1 litre autoclave with the catalyst concentration of 660 and 165 ppm on metal basis. In the example cited in Table 2, the autoclave was heated for 120 minutes at 180 bar at operation temperature. Hydrogen was continuously added through a sparger and passed through the reactor continuously at a rate of 350 Standard Litre Per Hour (SLPH) and removed through a back pressure valve to maintain pressure. The hydrogen stripped out the light products which were condensed in a high pressure separator. The unconverted oil and solid i.e. pitch was deoiled using a suitable solvent i.e. toluene. The hydrocarbon oil is decanted and the toluene insoluble solid is recovered. In Table 2, all of the yield numbers are calculated as a ratio to the feed. The coke is characterized by XRD technique. The coke sample does not exhibit any crystallinity as can be seen in FIG. 3.

TABLE 2

Product yield with different catalyst concentration (660, 165 ppm) on fresh feed basis at 450° C. and pressure of 180 bar.

| | | Feed | Case-I | Case-II |
|---|---|---|---|---|
| Cat. Conc (Metal basis) | ppm | | 660 | 165 |
| Reactor WABT | ° C. | | 450 | 450 |
| Pressure | bar | | 180 | 180 |
| Yield (Fresh Feed Basis) | | | | |
| H$_2$S + NH$_3$ | wt % | | 5.25 | 4.48 |
| Off Gas (C$_1$&C$_2$) | wt % | | 5.16 | 8.44 |
| LPG | wt % | | 3.62 | 2.95 |
| Naptha (C5-132° C.) | wt % | | 6.91 | 11.91 |
| LGO (132° C.-380° C.) | wt % | | 55.29 | 51.59 |
| HGO (380° C.-500° C.) | wt % | 11.6% | 12.00 | 10.62 |
| HVGO (500° C.-525° C.) | wt % | 2.4% | 2.50 | 2.21 |
| UCO (525° C.+) | wt % | 86% | 8.57 | 8.33 |
| Toluene insoluble | | | 2.40 | 4.11 |

EXAMPLE 3

An oil soluble organometallic compound i.e. ferrocene which acts as a hydrogenation catalyst was used. The catalyst was pretreated by adding 2 wt % sulfiding agent relative to the feed and catalyst and heating the mixture to 220° C. at 30 bar and charging the heated mixture at high temperature and high velocity through a 10 meter long tube in a 1 litre autoclave reactor using hydrogen gas within 15 minutes to activate the catalyst before heating the mixture to reaction temperature in the autoclave. In a typical experiment, 300 grams of vacuum resid of Example 1 was charged in a 1 litre autoclave with the catalyst concentration of 330 and 660 ppm on metal basis. In the example cited in Table 2, the autoclave was heated for 120 minutes at 180 bar at operation temperature. Hydrogen was continuously added through a sparger and passed through the reactor continuously at a rate of 350 SLPH and removed through a back pressure valve to maintain pressure. The hydrogen stripped out the light products which were condensed in a high pressure separator. The unconverted oil and solid i.e. pitch was deoiled using a suitable solvent i.e. toluene. The hydrocarbon oil is decanted and the toluene insoluble having graphitic nature is recovered. In Table 3, all of the yield numbers are calculated as a ratio to the feed. The coke is characterized by XRD and SEM techniques. The coke sample exhibit crystallinity as can be seen in FIGS. 2 and 3.

TABLE 3

Product yield with different catalyst concentration (330, 660 ppm) on fresh feed basis at different operating temperature (430 and 450° C.) and pressure of 180 bar.

| | | Feed | Case-I | Case-II | Case-III |
|---|---|---|---|---|---|
| Cat. Conc (Metal basis) | ppm | | 660 | 660 | 330 |
| Reactor WABT | ° C. | | 430 | 450 | 450 |
| Pressure | bar | | 180 | 180 | 180 |
| Yield (Fresh Feed Basis) | | | | | |
| H$_2$S + NH$_3$ | wt % | | 4.54 | 3.28 | 3.3 |
| Off Gas (C$_1$&C$_2$) | wt % | | 3.65 | 3.7 | 10.82 |
| LPG | wt % | | 1.96 | 2.07 | 4.02 |
| Naptha (C5-132° C.) | wt % | | 8.85 | 4.93 | 5.38 |
| LGO (132° C.-380° C.) | wt % | | 50.66 | 65.6 | 45.87 |
| HGO (380° C.-500° C.) | wt % | 11.6% | 11.36 | 7.31 | 5.93 |
| HVGO (500° C.-525° C.) | wt % | 2.4% | 2.37 | 1.52 | 1.23 |
| UCO (525° C.+) | wt % | 86% | 13.1 | 8.5 | 15.9 |
| Toluene insoluble | | | 6.11 | 6.81 | 12.2 |

We claim:

1. A method of producing in situ catalyst in a hydrocracking process, comprising:
    (a) providing a mixture of hydrogen, heavy hydrocarbon oil, and an oil soluble catalyst, and
    (b) decomposing the oil soluble catalyst by preheating the mixture at a predetermined fast enough velocity to predetermined temperature and passing through a confined hydrocracking zone maintained at a temperature between about 250° C. and 550° C., pressure between 40 to 250 bar and a space velocity of 0.5 h–1 up to 4 h–1, to obtain a finely dispersed nano sized metallic iron particles in hydrocarbon oil, wherein, the nano sized metallic iron particles act as hydrogenating catalyst.

2. The method of claim 1, wherein the oil soluble catalyst is used in the range of about 0.01-2% by weight of heavy hydrocarbon oil.

3. The method of claim 2, wherein the heavy hydrocarbon oil is selected from the group comprising of atmospheric tower bottoms products, vacuum tower bottoms products, crude oil residuum, heavy vacuum gas oils, tar sand bitumen or mixture thereof.

4. The method of claim 1, wherein the oil soluble catalyst is ferrocene.

5. The method of claim 4, wherein the heavy hydrocarbon oil is selected from the group comprising of atmospheric tower bottoms products, vacuum tower bottoms products, crude oil residuum, heavy vacuum gas oils, tar sand bitumen or mixture thereof.

6. The method of claim 1, wherein the nano sized iron particles is composed of iron atoms in the range of 10 to 100.

7. The method of claim 6, wherein the heavy hydrocarbon oil is selected from the group comprising of atmospheric tower bottoms products, vacuum tower bottoms products, crude oil residuum, heavy vacuum gas oils, tar sand bitumen or mixture thereof.

8. The method of claim 1, wherein the decomposition starts from 400° C. and gets completed before the feed and the catalyst reaches the slurry reactor.

9. The method of claim 8, wherein the heavy hydrocarbon oil is selected from the group comprising of atmospheric tower bottoms products, vacuum tower bottoms products, crude oil residuum, heavy vacuum gas oils, tar sand bitumen or mixture thereof.

10. The method of claim 1, wherein the heavy hydrocarbon oil is selected from the group comprising of atmospheric tower bottoms products, vacuum tower bottoms products, crude oil residuum, heavy vacuum gas oils, tar sand bitumen or mixture thereof.

11. A method of producing graphite, comprising:
    (a) providing a mixture of hydrogen, heavy hydrocarbon oil, and an oil soluble catalyst,
    (b) decomposing the oil soluble catalyst by preheating the mixture at a predetermined fast enough velocity to predetermined temperature and passing through a confined hydrocracking zone maintained at a temperature between about 250° C. and 550° C., pressure between 40 to 250 bar and a space velocity of 0.5 $h^{-1}$ up to 4 $h^{-1}$, to obtain a finely dispersed nano sized metallic iron particles in hydrocarbon oil,
    (c) hydrocracking the resultant of step (b) in a slurry reactor at elevated temperatures in the range of 400° C. to 510° C.,
    (d) fractionating the effluent of step (c) to obtain a fraction boiling above 500° C. containing solid catalyst and coke particles,
    (e) further fractionating/separating the fraction obtained in step (d) to obtain a fraction boiling above 525° C. termed as pitch,
    (f) de-oiling the pitch to obtain graphite.

12. The method of claim 11, wherein de-oiling of the pitch is processed using a solvent selected from propane, butane, pentane, hexane, heptanes, benzene, toluene, LPG, or a mixture thereof.

13. The method of claim 12, wherein the heavy hydrocarbon oil is selected from the group comprising of atmospheric tower bottoms products, vacuum tower bottoms products, crude oil residuum, heavy vacuum gas oils, tar sand bitumen or mixture thereof.

14. The method of claim 11, wherein the volumetric ratio of solvent to pitch is from 0.5 to 10 vol/vol, and the temperature of extraction is in the range of 100 to 250° C.

15. The method of claim 14, wherein the heavy hydrocarbon oil is selected from the group comprising of atmospheric tower bottoms products, vacuum tower bottoms products, crude oil residuum, heavy vacuum gas oils, tar sand bitumen or mixture thereof.

16. The method of claim 11, wherein the heavy hydrocarbon oil is selected from the group comprising of atmospheric tower bottoms products, vacuum tower bottoms products, crude oil residuum, heavy vacuum gas oils, tar sand bitumen or mixture thereof.

17. A method for the hydrocracking conversion of heavy hydrocarbon oils into premium quality lighter hydrocarbon products, the method comprising:
    (a) providing a mixture of hydrogen, heavy hydrocarbon oil, and oil soluble catalyst, decomposing the oil soluble catalyst by preheating the mixture at predetermined fast enough velocity to predetermined temperature and passed through a confined hydrocracking zone in upflow mode being maintained at temperature between 250° C. and 550° C., pressure between 40 to 250 bar and a space velocity of 0.5 $h^{-1}$ up to 4 $h^{-1}$ to obtain a finely dispersed nano sized metallic iron particles in hydrocarbon oil,
    (b) passing the resultant of step (a) into a slurry reactor for hydrocracking,
    (c) separating the effluent of step (b) into a first portion comprising hydrocarbons boiling upto 500° C. and free of solid catalyst particles and second portion boiling above 500° C. containing solid catalyst and coke particles,
    (d) hydrotreating the first portion in a conventional hydrotreating reactor under conventional hydroprocessing conditions using conventional hydrotreating catalysts and fractionating to obtain premium quality lighter hydrocarbon products boiling upto 370° C. and hydrotreated Vaccum Gas Oil (VGO),
    (e) optionally recycling the VGO to conventional hydrotreating reactor,
    (f) separating the second portion of step (c) into a first part boiling between 500 and 525° C. termed as Heavy Vacuum Gas Oil (HVGO) and a second part boiling above 525° C. termed as pitch,
    (g) optionally recycling the HVGO into the slurry reactor,
    (h) deoiling the first part of step (f) using a solvent to obtain an extracted oil portion and graphite,
    (i) optionally recycling the extracted oil portion to the slurry reactor.

18. The method of claim 17, wherein the HVGO is aromatic rich stream.

19. The method of claim 17, wherein the heavy hydrocarbon oil is selected from the group comprising of atmospheric tower bottoms products, vacuum tower bottoms products, crude oil residuum, heavy vacuum gas oils, tar sand bitumen or mixture thereof.

* * * * *